Nov. 27, 1923
J. BATH ET AL
1,475,561
COMBINED REAMER AND TAP
Filed April 27, 1921
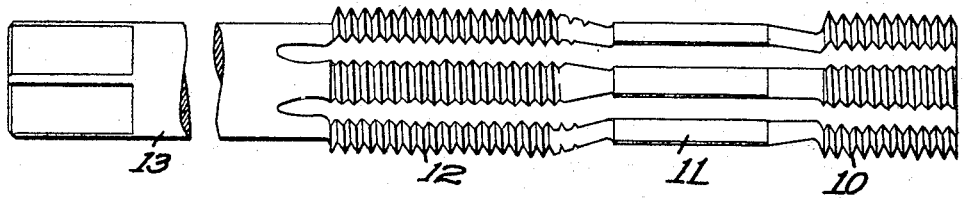
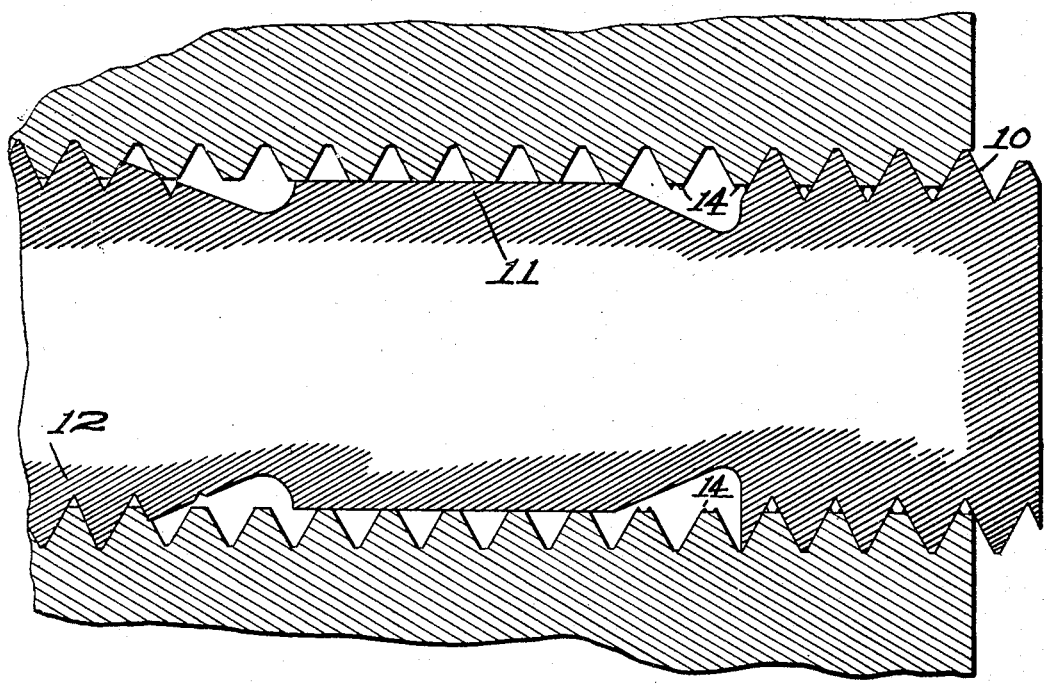
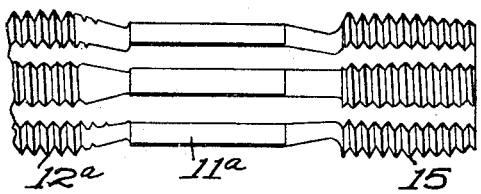
Inventors
John Bath
Harry F. Clifford
By Attorneys
Southgate & Southgate
Witness
C. F. Weston Patented Nov. 27, 1923.

1,475,561

UNITED STATES PATENT OFFICE.

JOHN BATH AND HARRY F. CLIFFORD, OF WORCESTER, MASSACHUSETTS; SAID CLIFFORD ASSIGNOR TO SAID BATH.

COMBINED REAMER AND TAP.

Application filed April 27, 1921. Serial No. 464,806.

*To all whom it may concern:*

Be it known that we, JOHN BATH and HARRY F. CLIFFORD, citizens of the United States, both residing at Worcester, in the county of Worcester and State of Massachusetts, have invented a new and useful Combined Reamer and Tap, of which the following is a specification.

This invention relates to a combination tool comprising in a single unit a reamer and a finishing tap. It is the object of our invention to provide a combined reamer and tap by which increased accuracy in the production of tapped holes may be achieved. For such purposes it is essential that the finishing tap should follow accurately the thread cut by the roughing tap but it is found that the burrs raised by the roughing tap frequently divert the finishing tap from its true path of movement. Accordingly, one important feature of our invention relates to the provision of a combined reamer and tap so constructed that the reamer will remove the roughing burrs and bring the hole accurately to finished size before the finishing tap enters the thread.

In order that the reamer may accurately perform its functions, we find it also desirable to provide for the accurate centering of the reamer and for this purpose a further feature of our invention relates to the provision of a threaded pilot which will enter and follow the rough tapped thread and which will not be diverted by the burrs left in the hole.

Further features of our invention relate to combinations of parts which will be hereinafter described and more particularly pointed out in the appended claim.

A preferred form of the invention and modifications therein are shown in the drawings in which Fig. 1 is a side elevation of our improved tap and reamer;

Fig. 2 is a partial longitudinal section thereof; and

Fig. 3 is a partial elevation of a modification.

Referring to Figs. 1 and 2, we have shown a combined reamer and tap comprising a threaded pilot 10, a reamer 11 and a finishing tap 12 together with the usual extension 13 to which a wrench or handle may be applied. The reamer is grooved or fluted longitudinally and the reamer blades and the teeth of the finishing tap 12 are backed off to provide clearance in the usual manner. The threaded pilot 10, however, is not commonly relieved or backed off, as the teeth have no cutting function but are formed the right size to enter the rough tapped hole as shown in Fig. 2 and align the reamer and finishing tap with the thread already cut.

Reference to Fig. 2 will also show that the burrs 14 raised by the roughing tap will enter between the teeth of the pilot 10 and will thus not divert the pilot from its true position.

The reamer 11 is drawn into the hole by the pilot 10, removing the burrs 14 and reaming the hole to its exact finished size, after which the finishing tap 12 makes the light cut necessary to size the thread. The combined operation of the threaded pilot, the reamer and the finishing tap is found to produce unusually accurate results.

In Fig. 3 the threaded pilot is replaced by a roughing tap 15 formed as a unit with a reamer 11ª and finishing tap 12ª. This form of our invention is useful where it is desirable to rough tap, ream and finish a thread at a single operation, although under usual conditions we consider it preferable to attain the result by the use of two separate taps. When using this modified construction, the roughing tap 15 also serves as a threaded pilot for the reamer 11ª and finishing tap 12ª, the operation of the latter parts being substantially the same as previously described.

Having thus described our invention it will be evident that changes and modifications can be made therein by those skilled in the art within the spirit and scope of our invention as set forth in the claim, and we do not wish to be otherwise limited to the details herein disclosed but what we claim is:—

A combined reamer and tap for threading a cylindrical hole comprising a threaded pilot fitting the threads of a rough tapped hole, a finishing tap for said straight rough tapped hole, and a reamer interposed between said pilot and said tap and of a size effective to ream the rough tapped threads substantially to finished inner diameter and to remove burrs therefrom before the operation of the finishing tap.

In testimony whereof we have hereunto affixed our signatures.

JOHN BATH.
HARRY F. CLIFFORD.